Nov. 1, 1955  R. R. CROOKSTON  2,722,402
VALVE SEALING DEVICE
Filed Aug. 5, 1949
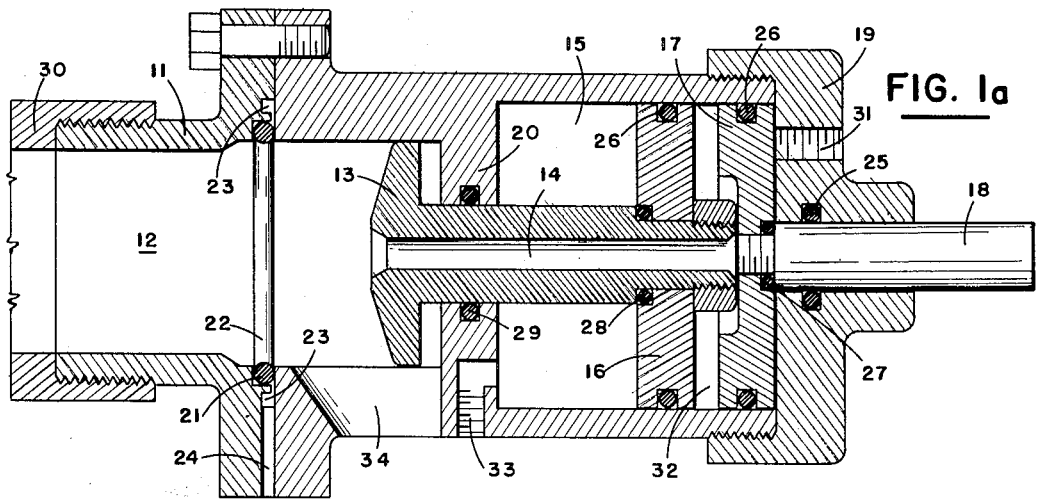
FIG. 1a
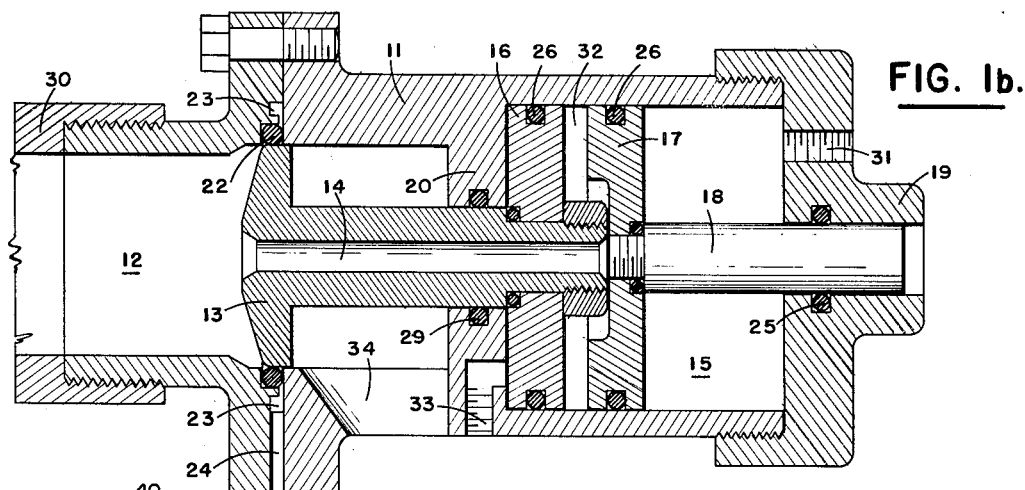
FIG. 1b.
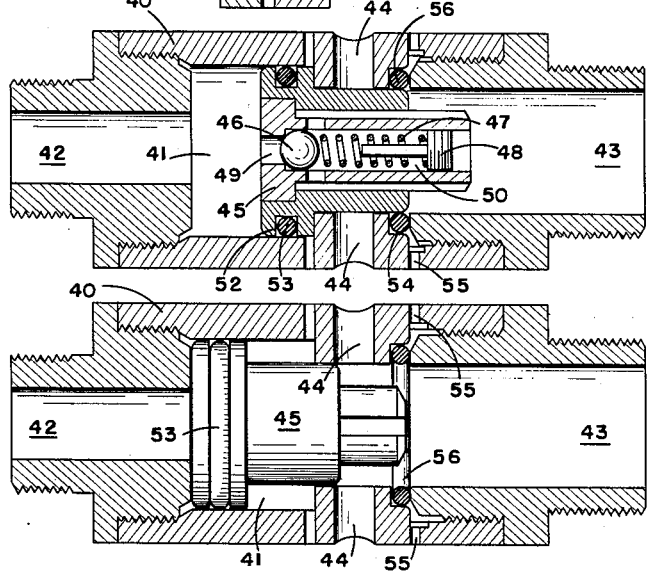
FIG. 2a.
FIG. 2b.
Robert R. Crookston,
INVENTOR.
BY
AGENT.

United States Patent Office 2,722,402
Patented Nov. 1, 1955

2,722,402

VALVE SEALING DEVICE

Robert R. Crookston, Houston, Tex., assignor, by mesne assignments, to Esso Research and Engineering Company, Elizabeth, N. J., a corporation of Delaware Application August 5, 1949, Serial No. 108,737

5 Claims. (Cl. 251—324)

The present invention is directed to a sealing device. More particularly, the invention is directed to the employment of annular rings for opening and closing seals under pressure. In its more particular aspects, the invention is directed to an improved apparatus embodying an annular sealing member.

Prior to the present invention it has been known to employ annular sealing rings such as rubber O-rings which have been used somewhat like piston rings and as a substitute for V-rings, piston cups and ordinary packings in service where the seal to be effected either remains stationary or is transitory as would be the case in a typical pump rod piston. In applications such as pop safety valves and any other elements that might employ O-rings fitting into ring grooves in pistons, special problems arise if the O-rings have to cross ports or enter restricted areas in any other manner in a way such as to effect openings and closures. In employing these O-rings it has been observed that the O-ring attempts to open against pressure; that is, it is inclined to be pulled out of its groove and either lost altogether or sheared as it crosses the port. To overcome this disadvantage of the O-rings many expedients have been adopted of holding the O-ring in place. A common way has been the incorporation of fabric or metal cores into the O-rings or making the rings of hard rubber. While these expedients have been useful to some extent the O-rings have not been entirely satisfactory since the disadvantages referred to above are still present.

Rubber is fundamentally an extendable or stretchable material and any force whatsoever that tends toward non-symmetry is likely to be sufficient to extract an O-ring constructed of rubber from a groove in which it is located. When the O-ring is embraced by a perfectly symmetrical port arrangement, such as a continuous symmetrical annular groove, unrestricted in all directions, or by a row of equally spaced port holes, the tendency of the rubber O-ring to extrude is less if the effect be unbalanced, such as it would be if the piston O-ring combination were to cross a port opening on one side only.

It has been customary to employ O-rings in grooves since it has been found that the O-rings may be confined and remain in the groove when employed in this manner.

It is the main object of the present invention to provide an improved sealing device employing an annular packing member located at a recess.

It is another object of the present invention to provide an improved apparatus in which a positive seal may be effected employing an annular packing member.

A still further object of the present invention is to provide an improved apparatus in which an annular packing member provides a seal with a slidable surface.

The objects of the present invention will be better understood by reference to the drawing in which Fig. 1a is a sectional view of a by-pass valve embodying the present invention showing the valve in the open position;

Fig. 1b is a similar view of the by-pass valve of Fig. 1a embodying the present invention with the valve in the closed position showing the seal effected thereby;

Fig. 2a is a sectional view of a quick release valve embodying the present invention with the valve in the closed position; and Fig. 2b is a sectional view of the valve of Fig. 2a in the open position.

In the drawing identical numerals will be employed to identify identical parts.

The principal parts of the device of the present invention are a housing defining a central passageway fluidly communicating with a first source of pressure and an annular recess in the central passageway defined by said housing which is adapted to receive an annular packing member. At least one second passageway is defined by said housing fluidly communicating with said recess and with a second source of pressure, and a deformable annular packing member is arranged in said recess and a sealing member which may be a slidable piston member is adapted to move past said packing member and to form a seal therewith.

Referring now to Figs. 1a and 1b, numeral 11 designates a housing defining a central passageway 12 in which is arranged a piston shaped member 13. Piston member 13 is bored to form a passageway 14 and is adapted to slide in the central passageway 12. Housing 11 defines a chamber 15 in which is arranged a pair of pistons 16 and 17. Piston 17 is threadably engaged with a guide rod 18 which slidably fits through a closure 19 of housing 11. Piston 13 makes a sliding fit with member 20 of housing 11 which defines, with closure 19, chamber 15. Housing 11 defines a rectangular recess or groove 21 in which is arranged an annular packing member or O-ring 22 which may be constructed of deformable rubber, either natural or synthetic, plastic, an elastomer, or any other material which has a tendency to extrude and flow under pressure. Recess 21 is in fluid communication with a collector groove 23 which in turn fluidly communicates with a passageway 24 defined by housing 11 and which opens to the atmosphere or to a source of low pressure. Central passageway 12, at its open end, is in fluid communication with a source of high pressure substantially above atmospheric or the source of pressure with which passageway 24 is in communication.

The guide rod 18 is provided with suitable conventional packing rings 25 to insure a seal thereof and the pistons 16 and 17 are similarly provided with packing rings 26, 27, and 28 to insure proper sealing thereof. Member 20 is also provided with a packing ring 29 to insure a seal between piston 13 and member 20.

The device of Figs. 1a and 1b may be connected to a conduit 30 connected to a source of high pressure fluid, such as mud, under pressure in the range between 300 and 3000 p. s. i. g. Assuming that a stream of mud is flowing through conduit 30 into central passageway 12 and it is desired to close the valve embodying the apparatus, air under pressure would be admitted into the apparatus by way of a conduit not shown connected to air inlet 31 defined by closure 19 which would force piston 17 against piston 13 which would cause the piston 13 to move against the flow of mud fluid in central passageway 12. As piston 13 moves in central passageway 12, bore 14 would be filled with mud and mud would fill the space 32 between pistons 16 and 17. Piston 13 would move past annular ring 22 forming a seal therewith. The pressure of mud in central passageway 12, however, would cause the O-ring or annular member 22 to remain in recess or groove 21 since the force would be asserted diagonally across the packing member and make the deformable packing ring seek to escape from its confinement through the groove 23 and passageway 24 since this passageway communicates with a source of pressure lower than that of the mud fluid. A positive seal would therefore be obtained. When it is desired to open the valve defined by the apparatus shown in Figs. 1a and 1b, air or other gas under pressure would be admitted to inlet 33 defined by housing 11 and member 20 into chamber 15. This pressure would work against piston 16 which in turn would move it toward piston 17 causing the mud in chamber 32 to be forced out through bore 14 into the central passageway 12 as piston 13 is moved backward by the force applied against piston 16, the outlet 34 would again be opened allowing the mud fluid to pass into central passageway 12 by conduit 30 and outwardly therefrom by outlet 34. As piston 13 moves past recess 21 containing annular member 22 it would tend to pull the annular member 22 from its groove if the principle embodied in the present invention did not serve to maintain the packing member 22 in place. Thus the deformable material or rubber would tend to flow from the recess following the piston 13, but the pressure exerted by the mud fluid in central passageway 12 is opposing this shearing force since the fluid and also the annular member 22 seek to escape by groove 23 and passageway 24 communicating with a source of low pressure. This opposing force effectively prevents the annular packing member from being pulled out from its recess 21 and thus being destroyed. The O-ring 22 effects a seal while the piston 13 is being withdrawn, resulting in a snap action like that in popping open a bottle of champagne. Thus the forces to which the annular member is exposed would cause it to be compressed or decreased in volume in view of Bournelli's theorem. Bournelli's theorem is simply that, neglecting friction, the total energy in a stream of fluid in any one direction remains constant; therefore, when fluid flows through a restriction its velocity is increased; its kinetic energy is increased at cost, however, to the potential energy. Stated more simply, the theorem is that where the velocity is greatest the pressure is least. Thus, in the device of the present invention in which a male plug is employed with a female O-ring to provide a seal and in which the male plug is removed, the superfluous pressure is released at the point of breaking the seal and the potential energy is converted to velocity energy and any positive pressure built up in the O-ring in the annulus containing it tends to compress the O-ring which by nature of the material of construction it cannot do and thus causes it to extrude very violently through any section of the opening in which there are plus or minus differences in kinetic energy. This phenomena is regularly suffered in arrangements in the prior art such as a valve body with an outlet in one direction only which is not symmetrical. In the present invention, however, the forces tending to eject the O-ring from its recess are overcome by allowing forces to be exerted diagonally across the O-ring tending to cause the O-ring to be extruded or seek to be extruded through the passageway communicating to a pressure source lower than that of the pressure source exerted against the annular packing member. It will be seen, therefore, from the foregoing description of the operation of the device of Figs. 1a and 1b that an improved sealing device has been described which allows a positive seal at all times which obviates dangers of the sealing member being pulled from a sealing position and destroyed.

Referring now to Figs. 2a and 2b with reference to a quick release valve, a housing 40 defines a central passageway 41 of a valve and further defines inlet port 42, an outlet port 43 and exhaust ports 44. Arranged in housing 40 is a piston member 45 provided with a ball check valve 46 actuated by a spring 47 which is mounted on member 48. Piston 45 is provided with a bore 49 communicating with a chamber 50 in which valve 46 is located. An annular passageway 51 fluidly communicates with chamber 50 and outlet 43. Piston 45 defines a recess 52 in which is arranged a packing ring 53 to allow a seal between the piston and inner surface of housing 40 defining central passageway 41. Housing 40 defines a recess 54 which is in fluid communication with a passageway 55 defined by housing 40 communicating with a source of lower pressure or communicating with the exterior surface of housing 40. Arranged in recess 54 is a deformable packing member 56 such as one constructed of rubber, an elastomer, plastic, and the like materials having a tendency to be extruded.

In operating the device of Figs. 2a and 2b it may be assumed that inlet 42 is connected to a source of high pressure air, not shown, and outlet 43 is connected to a mechanism employing air as an actuating medium such as a clutch or the like. Air under high pressure is admitted to inlet 42 and built up in central passageway 41 against piston 45. After the air pressure has reached a certain point valve 46 is compressed against spring 47 allowing the air to flow through bore 49, chamber 50 and annular passageway 51 to outlet 43 connected to the clutch not shown. The pressure in chamber 41 is sufficient to move piston 45 to the right in spite of the pressure drop across bore 49. This movement to the right effects a seal against the exhaust ports 44 between piston 45 and O-ring packing member 56, allowing pressure to build up in the device, chamber, and the like being fed by port 43. Thus, so long as pressure is maintained in chamber 41 it is also retained in port 43 and the clutch and the like being fed thereby. It is to be understood that the pressure drop across bore 49 closes the valve and the ball check valve 46 has nothing to do with filling the chamber or clutch communicating with port 43. Thus, valve 46 prevents air from escaping too easily from port 43 to port 42 and assures thrusting of the piston 45 to the left. It is the pressure drop across bore 49 that closes the valve assembly. When it is desired to release the pressure in port 43 or whatever device it is communicating with, air pressure is bled from chamber 41 through inlet 42 and the pressure drop across the piston 45 from outlet 43 to chamber 41 forces the piston to the left and breaks the seal between the piston 45 and O-ring 56, permitting quick release of air pressure to the exhaust port 44. When the piston 45 moves past the packing member 56 it would tend to be pulled from its recess 54 if the pressure of the air moving past it would not tend to extrude the packing member 56 through the passageway 55. Since this is impossible by virtue of the design thereof, the effect is to cause the O-ring 56 to be snugly held in the recess 54 and to allow it to perform its usual function of causing a seal between piston 45 and the packing member 56.

The apparatus of the present invention has been described and illustrated with the passageway communicating with a source of lower pressure on the exterior of a housing, namely atmospheric pressure. The invention has also been described and illustrated with one passageway communicating with the source of lower pressure on the exterior of the housing. It is to be understood that this passageway may be a plurality of passageways; in fact, it is preferred that a plurality of passageways be employed such that the O-ring will seek to be extruded through the plurality of passageways and thus be held snugly in the groove or recess provided for it. It will be seen that positive forces are trying to extrude the O-ring to the outside of the housing via the weeping annulus or bleeder holes which means that the O-ring is always held into place. When the seal is about to be broken as described and illustrated, these forces, explainable by the phenomena related to Bournelli's theorem, tend to cause the rubber O-ring to stretch, changing it from approximately circular cross section with little or no pressure on it to a rather elongated ellipse, the degree depending upon the differential pressures involved. The major axis of the O-ring extends from the weeping annulus to the escape annulus. The fact that the O-ring is under tension and distorted from circular cross section to elliptical, causes the ring to snap back into place by effect of the force of higher pressure across the O-ring, causing it to seek to escape through the weeper holes. The ring is under tension and distorted from circular cross section to elliptical, causing it to snap back into place so that the rate of effective opening depends not only on the rate of piston travel but also on the rate of spring back of the O-ring itself. This snap action actually reduces the total abrasion suffered by the O-ring and seat material in applications such as described with respect to Figs. 1a and 1b where the surfaces are in contact with abrasive fluid, such as mud.

When the piston or male member is closing and is about to enter the locus of the O-ring, negative or zero pressures exist (again explainable by Bournelli's theorem) and the O-ring tends to jump up to meet the plug, thus also affording an increase in the rate of closure with a benefit similar to that attained in snap action opening, namely reduction in abrasion. These fast openings and closings minimize erosion of the metallic and rubber parts and are important advantages in the handling of abrasive materials as pointed out before.

Thus, from the foregoing discussion it will be seen that it is impossible for the male member to shear the O-ring by impinging it against the edge of the opening annulus. Hence the forces opposing the O-ring to leave this recess overcome the tendency of the forces striving to remove the O-ring from the recess. In short, the pressure from the high pressure source seeks to escape to the low pressure source and this causes the O-ring to remain in its groove designed for that purpose.

The present invention may be applied in any application where a male member moves past an annular packing member to cause a seal therewith, such as for example in pop safety valves, by-pass valves, quick release valves, pumps, actuators, airplane struts, and other devices in which O-rings constructed of deformable materials are employed to effect a seal with a sliding member and the like where relative motion exists between male and female members.

The nature and objects of the present invention having been completely described and illustrated, what I wish to claim as new and useful and to secure by Letters Patent is:

1. Apparatus for providing a seal which comprises, in combination, a housing defining a first passageway fluidly communicating with a first source of pressure, an annular recess defined by said housing opening into said first passageway adapted to receive an annular packing member, at least a second passageway defined by a wall of said housing with a point of entry into said recess remote from the opening of the recess into said first passageway fluidly communicating said recess with an exterior surface of said housing and with a second pressure lower than the first source of pressure, a deformable annular packing member arranged in said recess defining a cylindrical surface and having a vertical cross-sectional area slightly less that that of the opening of said recess, and a sealing member in said first passageway adapted to form a seal with said deformable packing member.

2. Apparatus in accordance with claim 1 in which said second passageway is located in said housing surrounding the annular recess and is in uninterrupted communication with the recess.

3. A sealing device comprising, in combination, a housing defining a central passageway fluidly communicating with a first source of pressure, an annular recess defined by said housing opening into said central passageway adapted to receive an annular packing member, at least a second passageway defined by a wall of said housing with a point of entry into said recess remote from the opening of the recess into said first passageway fluidly communicating said recess with an exterior surface of said housing and with a second pressure lower than the first source of pressure, a deformable rubber annular packing member arranged in said recess defining a cylindrical surface and having a vertical cross-sectional area slightly less than that of the opening of the recess, and a sliding member in said central passageway adapted to form a seal with said deformable packing member.

4. A device in accordance with claim 3 in which said second passageway is located in said housing surrounding the annular recess and is in uninterrupted communication with the recess.

5. A sealing device comprising, in combination, a housing defining a central passageway fluidly communicating with a source of pressure in excess of atmospheric pressure, an annular rectangular groove defined by said housing opening into said central passageway adapted to receive an annular packing member, at least a second passageway defined by a wall of said housing with a point of entry into said groove remote from the opening of the groove into said central passageway fluidly communicating said groove with an exterior surface thereof exposed to atmospheric pressure, said second passageway being arranged in said housing substantially perpendicular to the longitudinal axis of said central passageway, a deformable rubber annular packing member defining a cylindrical surface and having a vertical cross-sectional area slightly less than that of the opening of said recess arranged in said groove, and a piston in said central passageway adapted to form a seal with said deformable packing member.

References Cited in the file of this patent

UNITED STATES PATENTS

| | | |
|---|---|---|
| 744,643 | Swan | Nov. 17, 1903 |
| 1,517,593 | Slate | Dec. 2, 1924 |
| 1,721,114 | Hampton | July 16, 1929 |
| 2,011,674 | Canady | Aug. 20, 1935 |
| 2,360,733 | Smith | Oct. 14, 1944 |
| 2,481,482 | Green | Sept. 13, 1949 |
| 2,574,851 | Wagner | Nov. 13, 1951 |

FOREIGN PATENTS

| | | |
|---|---|---|
| 11,477 | Great Britain | 1886 |
| 502,554 | Great Britain | 1939 |